(12) United States Patent  
Colk et al.

(10) Patent No.: US 7,892,151 B2
(45) Date of Patent: Feb. 22, 2011

(54) SPORTS BOARD SIMULATOR

(75) Inventors: Alan Clifford Colk, Coolangatta (AU); Michael Burke Hill, Coolangatta (AU)

(73) Assignee: Syco Industries Pty Limited, Coolangatta (AU)

( * ) Notice: Subject to any disclaimer, the term of this patent is extended or adjusted under 35 U.S.C. 154(b) by 236 days.

(21) Appl. No.: 12/086,877

(22) PCT Filed: Sep. 8, 2006

(86) PCT No.: PCT/AU2006/001312

§ 371 (c)(1),
(2), (4) Date: Jun. 20, 2008

(87) PCT Pub. No.: WO2007/070915

PCT Pub. Date: Jun. 28, 2007

(65) Prior Publication Data

US 2010/0167882 A1    Jul. 1, 2010

(30) Foreign Application Priority Data

Dec. 22, 2005 (AU) .............................. 2005907235

(51) Int. Cl.
*A63B 69/18* (2006.01)
(52) U.S. Cl. ........................................ 482/71; 482/143

(58) Field of Classification Search ................. 482/143, 482/139, 148, 146, 34, 79
See application file for complete search history.

(56) References Cited

U.S. PATENT DOCUMENTS

| 4,961,574 | A  |   | 10/1990 | Lew |
| 5,163,828 | A  |   | 11/1992 | Coddington |
| 5,403,253 | A  | * | 4/1995  | Gaylord ........................ 482/43 |
| 6,929,478 | B1 | * | 8/2005  | Spencer et al. .............. 434/247 |
| 6,932,710 | B1 |   | 8/2005  | Hartin |

* cited by examiner

*Primary Examiner*—Lori Baker
(74) *Attorney, Agent, or Firm*—Stein McEwen, LLP

(57) ABSTRACT

A sports board simulator (10) comprising a main frame assembly (11) which is suspended from an elevated anchor point so as to be free for at least limited pivoting and swinging movement about the anchor point, the main frame assembly (11) including arms (17) which can be gripped by a user and/or the user can be secured to the frame assembly (11) by a harness (25). An elongated board (40) upon which the user may stand is suspended from the main frame assembly (11) via an intermediate frame (36) which permits the board (40) to move relative to the main frame assembly (11) about a pivot axis (C-C) extending transversely of the main frame assembly (11). The board (40) is also capable of pivoting about further axes D-D, E, and F.

29 Claims, 10 Drawing Sheets

SPORTS BOARD SIMULATOR

TECHNICAL FIELD

This invention relates to a sports board simulator and in particular to a simulator which is designed to simulate manoeuvres used in surfing, skateboarding, snowboarding or kiteboarding. The simulator of the invention however may also be used for the purposes of exercise or a fitness program or simply for enjoyment.

BACKGROUND ART

Surfboard riding, skateboarding, snowboarding and kiteboarding are popular activities each of which requires a board of varying designs upon which the user stands and which the user rides. In the case of surfboards and skateboards, the rider is usually separate from the board whilst in the case of snowboarding or kiteboarding, the rider is retained to the board by boot connections, foot straps or other connection means.

It is often difficult for novices to learning to ride boards in the above activities whether on the sea or on water, on land or on snow as balance is difficult because the board is mobile. Furthermore, novices often only have a short time available to learn to ride a board. Learning to surf for example is best undertaken at the sea when conditions are suitable. Even when the surf is suitable for a learner, it is often extremely difficult and frustrating for persons to try and learn to balance and control a board in the short time available on a wave. Learning to ride snowboards obviously requires snow which therefore limits this activity to persons who have access to these conditions. Learning to kiteboard also requires suitable conditions of wind.

Skateboarding and kiteboarding are also difficult activities which can take many hours for a novice to gain competency.

Even persons who are competent in riding boards in the above activities are required to spend many hours maintaining their skills or fitness or in increasing their skills and fitness. In the case of surfboard riding for example, riders wishing to maintain or increase their skills are constrained by wave conditions. Similarly in the case of snowboarding and kiteboarding, riders are limited by the availability of snow and wind conditions respectively.

SUMMARY OF THE INVENTION

The present invention aims to provide a sports board simulator which is particularly but not exclusively suited for assisting beginners in learning how to balance on a sports board and perform manoeuvres safely and correctly. The present invention also aims in another aspect to provide a simulator which enables board riders including experienced riders to improve their techniques or skills in board riding as well as fitness. Other objects and advantages of the invention will become apparent from the following description.

The present invention thus provides in a preferred aspect a sports board simulator comprising:—a main frame assembly, said main frame assembly including a sub-frame adapted to be suspended from a single elevated anchor point via a suspension frame member whereby said main frame assembly is free for at least limited rotational pivoting and swinging movement about said anchor point, said main frame assembly being adapted to be gripped by or secured to a user of said simulator, an elongated board adapted to support said user, and board suspension members suspending said board directly or indirectly from said main frame assembly, said board suspension means being connected tat a pair of spaced pivot points to said main frame assembly, said pivot points being spaced apart along a first pivot axis extending transversely of said main frame assembly, said board suspension members permitting said board to move freely relative to said main frame assembly about said pivot points.

The term "board" as used herein includes any board-like member which may be constructed or any material such as timber, metal or plastics material and which has a shape and size which approximates the shape and size of a skateboard deck, a surfboard, a snowboard or a kite-surfing board.

Preferably the first pivot axis is located adjacent the main frame assembly. Preferably also the pivot axis is defined by the connection of the board suspension members to the main frame assembly.

The main frame assembly suitably includes a sub-frame and the sub-frame may be suspended from the anchor point via a suspension frame member. Preferably the suspension frame member is adapted in use to hang from the anchor point and preferably the anchor point is positioned substantially above the rider in use when the simulator is in an at-rest position. Suitably the suspension frame member extends in use upwardly and over the rider to the anchor point in the at-rest position. The suspension frame member may be of a curved configuration or may be of V-shaped configuration or any other configuration. The suspension frame member suitably comprises a rigid member and suitably is formed from a relatively thin elongated member such as a tubular member. The suspension frame member may be bent or alternatively formed into the required shape.

The sub-frame suitably normally extends generally horizontally in an at-rest position of the simulator. The sub-frame is preferably rigid with the suspension frame member. The sub-frame may be permanently fixed to the suspension frame member or detachably fixed thereto. The sub-frame suitably includes opposite arms, respective ones of which may be gripped by a user. The sub-frame suitably is of U- or V-shaped configuration in plan view and extends symmetrically relative to the suspension frame member. Alternatively the attachment frame may be at least partly arcuate in plan view.

The arms of the sub-frame suitably include or define gripping means for gripping by a rider. The gripping means may comprise the arms or extensions thereof. Preferably the arms and/or extensions thereof extend at least to the sides of rider but preferably the arms or extensions thereof extend forwardly of the rider. The gripping means may comprise handles on the ends of, or on extensions of, the arms. Where extensions define the handles, the extensions are suitably telescopically engaged with the arms. Preferably the handles may be set at one or more set positions extending from the ends of the arms. The handles may be provided with grips at their ends to facilitate gripping by the user.

Preferably means are also provided to enable a user to be releasably secured to the sub-frame. The releasable securing means suitably comprise means adapted to be secured about the waist or hips of a user. The releasable securing means suitably comprises a belt or harness provided with releasable connection means to enable the belt or harness to be secured around the rider's waist or hips. The releasable connection means may comprise any known buckles such as male and female buckles. Alternatively the releasable attachment means may comprise studs, hook and loop material such as Velcro type material or combinations of the above.

The belt or harness is suitably adapted to be releasably attached to the sub-frame. For attachment to the sub-frame, the belt or harness may include spaced attachment means on one side for attachment to opposite arms of the sub-frame. The attachment means in one form may comprise studs on the belt or harness for engagement with the respective arms of the sub-frame. The studs may be received in apertures in the arms of the sub-frame or lugs carried by the arms of sub-frame. Preferably the belt or harness is attached by the attachment means to the sub-frame so as to be capable of limited pivotal movement about an axis extending transversely of the sub-frame and substantially parallel to the first pivot axis. The axis is typically defined by the studs.

Preferably the board is further supported so as to be capable of at least limited pivotal movement about an axis extending transversely of board and normal to the first pivot axis. The board is further suitably supported so as to be capable of at least limited pivotal movement about an axis extending substantially normal to the board and normal to the first pivot axis. Preferably also the board is further supported for at least limited movement about an axis extending longitudinally of the board and substantially parallel to the first pivot axis.

Preferably the movements of the board as referred to above are achieved by the manner in which the board is suspended from the main frame assembly by the board suspension members. In a particularly preferred form, the board suspension members may comprise an intermediate frame suspended from the main frame assembly. The intermediate frame is suitably suspended from the main frame assembly so as to be capable of pivoting movement about the first pivot axis. Preferably the intermediate frame is of a shape to at least partially surround the rider in use.

Preferably first suspending members suspend the intermediate frame from the sub-frame of the main frame assembly for pivotal movement of the intermediate frame about the first pivot axis The intermediate frame is also suitably supported by the first suspending members for pivotal movement about a second pivot axis which is spaced from and substantially parallel to the first pivot axis. The first suspending members suitably comprise suspending elements at opposite sides of the intermediate frame. The suspending elements may comprise first elongated elements or links. The first elongated elements or links may be flexible links for example ropes, webbing, cords, chains or wires or combinations thereof. The links or elements alternatively may be rigid links such as rigid rods.

Preferably the intermediate frame comprise an annular or ring-shaped member and the first elements or links suitably comprise a pair of links connected to the ring-shaped member on respective diametrically opposite sides thereof. The intermediate frame may be covered in a protected covering such as neoprene material so that possible impact with a rider is cushioned The first links or elements are suitably connected at the upper ends to the opposite arms respectively of the sub-frame and at their lower ends to the intermediate frame. The arms may have different mounting positions for the upper ends of the first elements or links defining different positions of the first pivot axis. The mounting positions may be defined in lugs on the opposite arms. The different mounting positions may comprise spaced mounting apertures on the respective lugs through which the first elements or links may be secured to the arms such as by suitable shackles or other connectors.

Preferably the connection between the first suspending members and the intermediate frame defines the second pivot axis. Thus the connection of the first elements or links to the intermediate frame define the second pivot axis. Preferably shackles or other connectors may be provided for connecting the lower ends of the first elements or links to the intermediate frame.

Preferably the board is suspended by second suspending members from the intermediate frame for movement about a third pivot axis extending substantially normal to the first and second pivot axes. Preferably the second suspending members comprise opposite suspending elements Preferably the suspending elements comprise second elongated elements or links. Preferably the second suspending elements are connected at their upper ends to the intermediate frame and at their lower ends to the board, the connection of the second suspending elements to the intermediate frame defining the third pivot axis. Preferably the second suspending elements are connected to the intermediate frame on diametrically opposite sides thereof at a position substantially at 90 degrees to the connection of the first suspending elements to the intermediate frame.

The second elements or links suitably comprise flexible elements or links such as ropes, webbing, cords, chains or wires or combinations thereof. The links or elements may alternatively be rigid links or elements. The second suspending elements may be connected at their upper ends to the intermediate frame by shackles or other connection means.

Preferably the lower ends of the second suspending elements are connected to opposite sides of the board at a position intermediate and preferably centrally between its ends. The connection of the second suspending elements to the board define a fourth pivot axis for the board extending substantially parallel to the third pivot axis. The second suspending elements may be connected at their lower ends to eyelets provided on opposite sides of the board. The second suspending elements may be coupled by shackles such as snap shackles or any other form of connectors to the eyelets.

The second suspending elements also allow for limited pivotal movement of the board relative to the intermediate frame about a fifth axis extending normal to the first and second and third and fourth axes.

The suspension frame member of the main frame assembly may be suspended in use from any elevated anchor point for example by being connected to an eye-bolt or screw secured to a ceiling frame member or beam so as to be free for rotational movement about a vertical axis and swinging movement in any direction. The main frame member may alternatively be suspended from the elevated anchor point by a universal joint. Alternatively the main frame member may be hung from a horizontal rail or the like. Means may be provided for resisting pivotal movement of the main frame assembly about a vertical axis. The resisting means may comprise resilient or elastic means which provide a resilient resisting force to rotation of the main frame assembly and which will tend to return the main frame assembly towards a non-pivoted position. The resilient resisting means may be associated with the means by which the suspension frame member is connected to the anchor point.

The manner of support of the board described above allows pivotal movement of the board about a transverse axis as well as swinging of the board in opposite directions and limited pivotal movement of a board about a vertical axis. The intermediate frame allows further pivotal movement of the board about an axis extending at right angles to its transverse axis of pivotal movement but spaced from that axis. The range of movements possible therefore allow the rider to experience a wide range of movements as encountered as if riding a surfboard, skateboard, snowboard or kite surfing board.

BRIEF DESCRIPTION OF THE DRAWINGS

In order that the invention may be more readily understood and put into practical effect, reference will now be made to the accompanying drawings which illustrate a preferred embodiment of the invention and wherein:—

DETAILED DESCRIPTION OF THE PREFERRED EMBODIMENT

Figure 1:
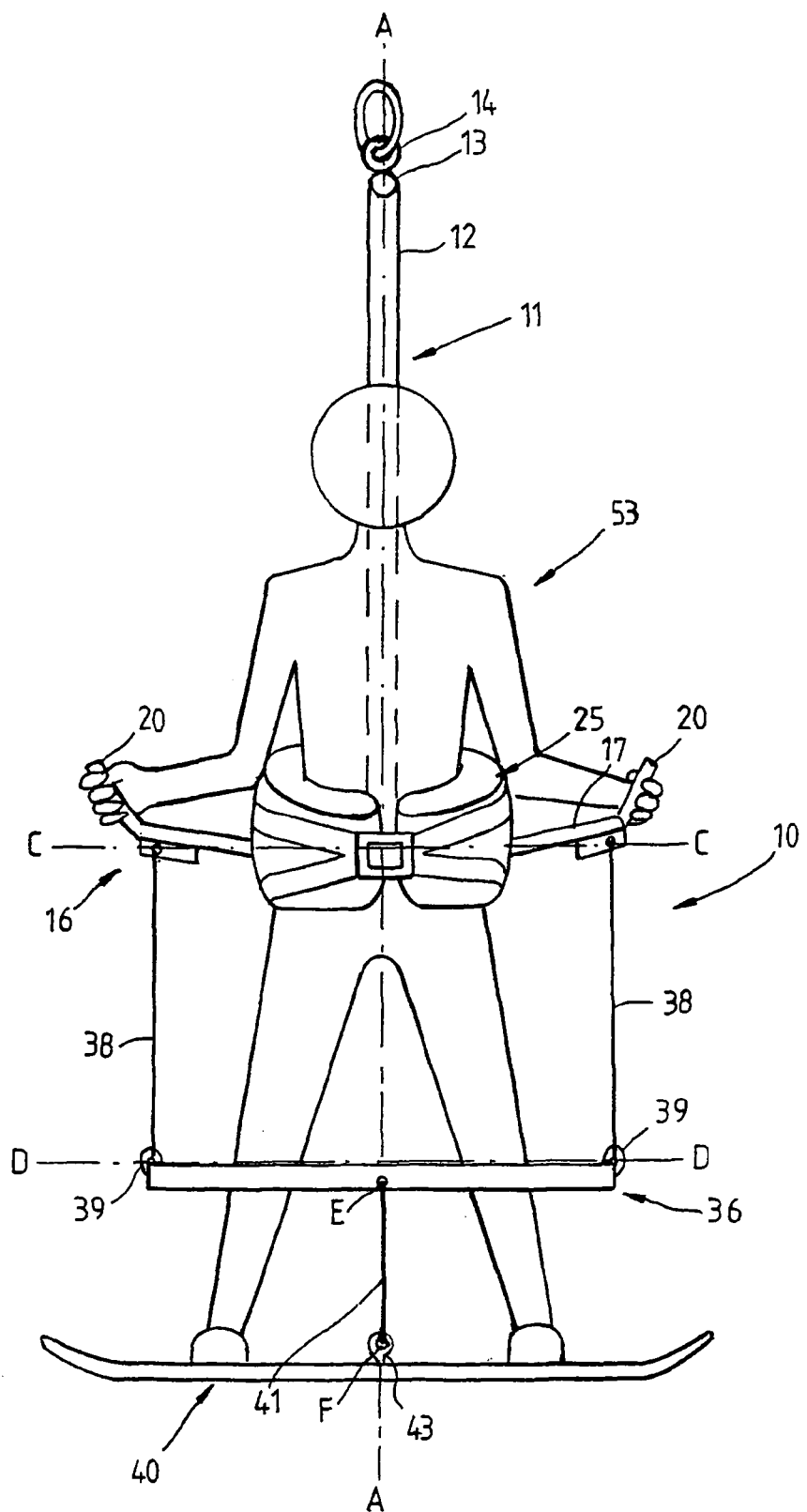
FIG. 1 is front elevation of a sportsboard simulator according to an embodiment of the invention with a rider or user supported thereon.
Figure 2:
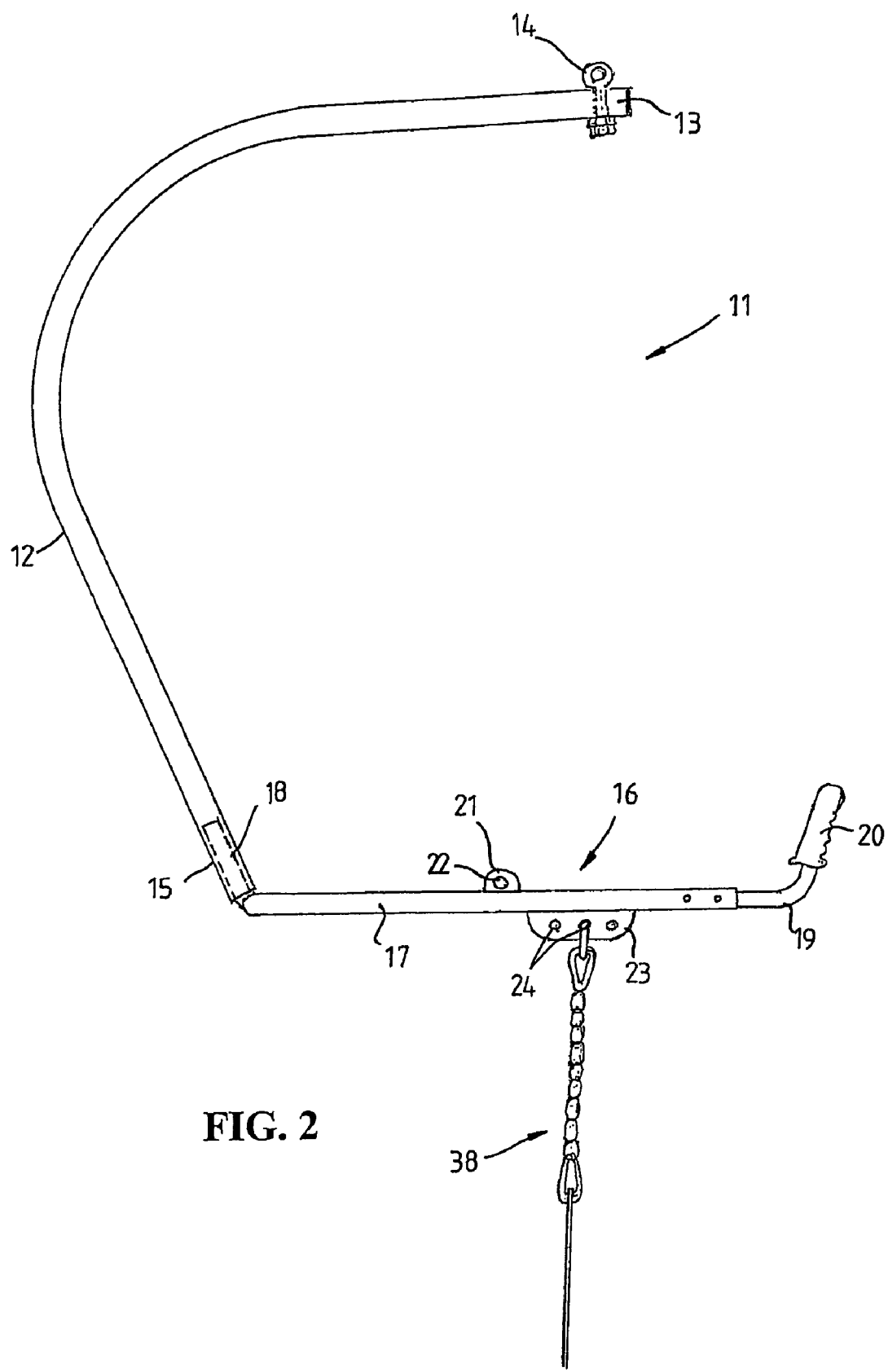
FIG. 2 is a side view of the main frame assembly of the simulator.

Referring to the drawings and firstly to FIGS. 1 to 4, there is illustrated a sports board simulator 10 according to an embodiment of the invention, the simulator 10 including a main support frame assembly 11 adapted to be suspended from an elevated anchor point. The main frame assembly 11 comprises a part-arcuate suspension frame member 12 typically a tubular member having a first upper end 13 which carries an eye-bolt 14 or other coupling through which the member 12 may be attached to the anchor point and a second lower end 15 to which a sub-frame 16 is secured, the sub-frame 16 being supported by the frame member 12 symmetrically relative to a longitudinal axis A-A of the simulator 10, the axis A-A in the at-rest position of the simulator 10 being substantially vertical. The frame member 12 whilst shown to be of a part-circular or arcuate shape may be of various different forms for example square, rectangular, elliptical or V- or U-shaped.

Figure 3:
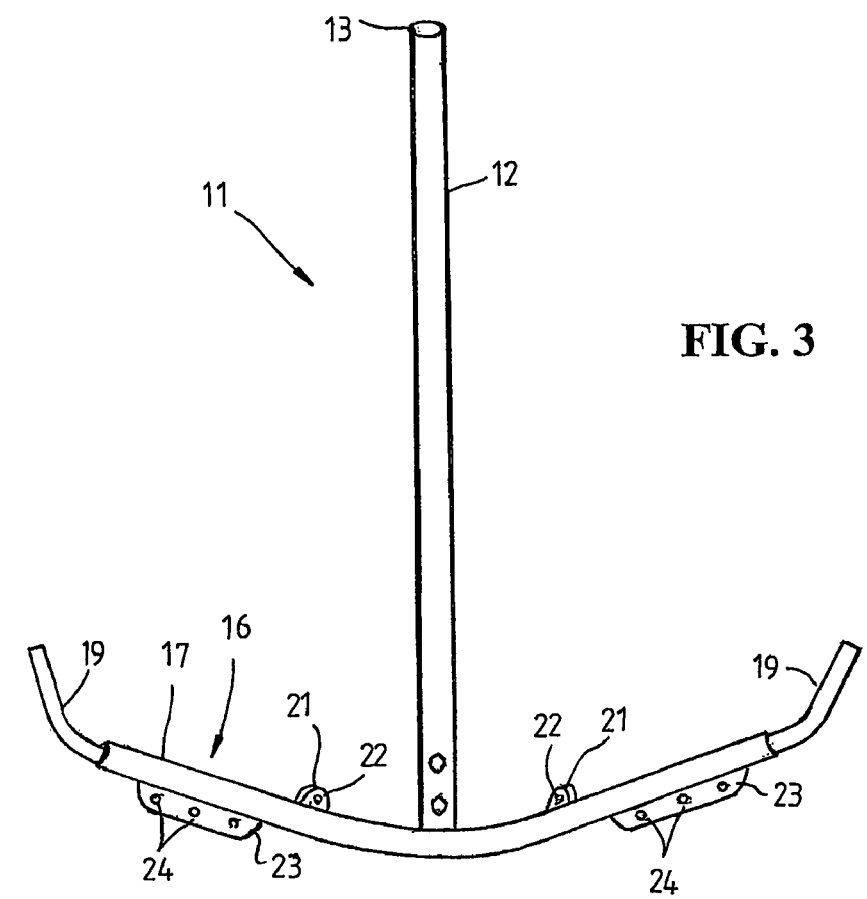
FIG. 3 is a front view of the main frame assembly of the simulator.
Figure 4:
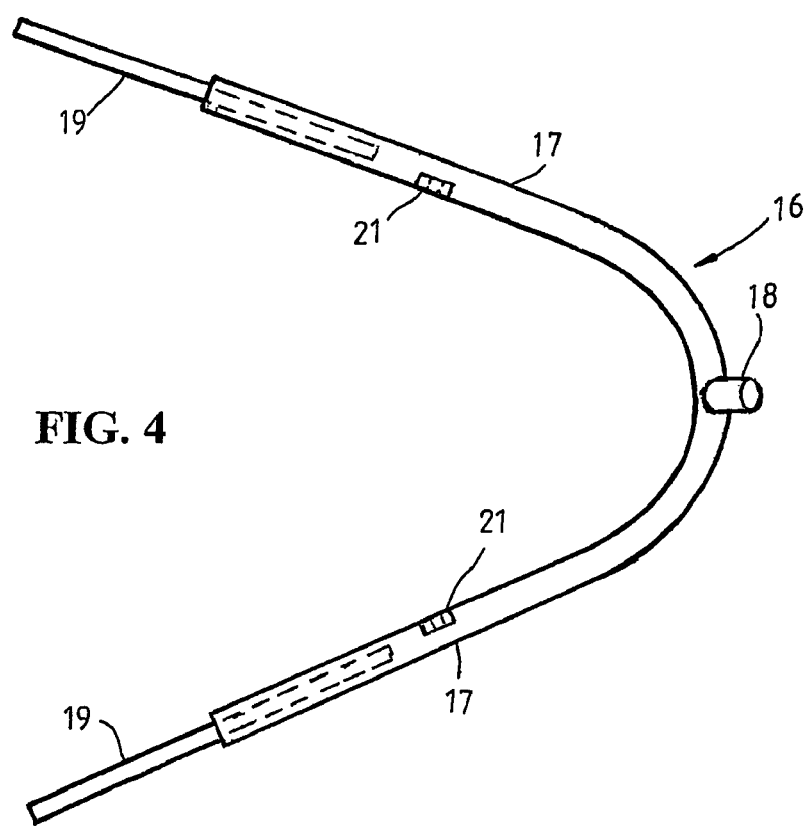
FIG. 4 is a plan view of the main frame assembly of the simulator.

The sub-frame 16 as shown more clearly in FIGS. 3 and 4 is of generally U- or V-shaped in plan view having a pair of opposite divergent arms 17 and a central spigot 18 at its apex extending transversely and upwardly of the arms 17 which is received within the lower end 15 of the suspension frame member 12 and welded or bolted thereto. Removable handle members 19 are provided at the free ends of the arms 17 and telescopically receivable therein so as to be extendable from the arms 17, the handle members 19 being angled upwardly in the embodiment illustrated and carrying hand grips 20. A first pair of transversely aligned lugs 21 having apertures 22 therein are provided on opposite sides of the sub-frame 16 being fixed to the upper sides of the respective arms 17. Further lugs 23 are also provided on opposite sides of the frame 16 and fixed to the lower sides of the respective arms 17. The lugs 23 are provided with a plurality of spaced apertures 24 for a purpose which will hereinafter become apparent.

Figure 11:
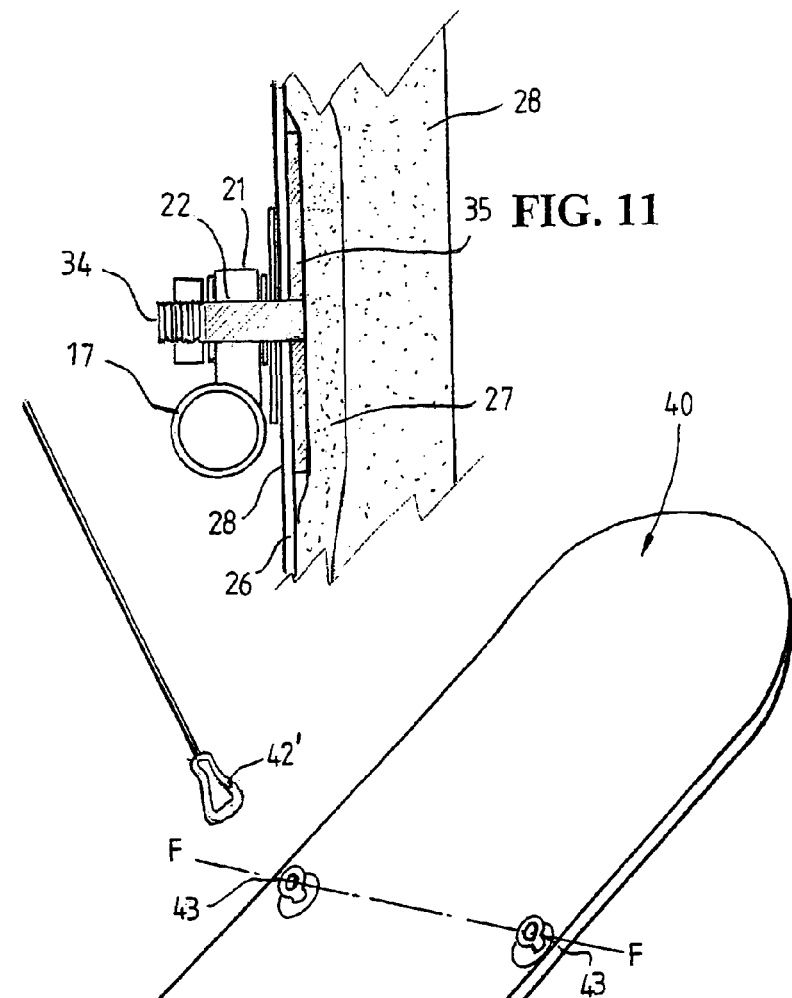
FIG. 11 illustrates the manner in which the harness is secured to the arms of the sub-frame of the main frame assembly and a cross section of the harness in that region.

The sub-frame 16 supports a harness 25 (see also FIGS. 7 to 10) which is adapted to be secured around the body of the user in the region of the waist or hips. The harness 25 is a belt-like member and comprises in this embodiment an outer panel 26 of heavy plastic padded with inner layers of foam 27 and 28. The layer 27 is in this embodiment 10 mm high density foam and the layer 28 comprises 50 mm medium density foam. The foam 27 and 28 and panel 26 are enclosed within an outer cover 29 of fabric or other pliable material. Webbing straps 30 are secured to the inner side of the cover 29 such as by sewing with one end of the straps 30 terminating in a female buckle 31 and the other end passing freely through a loop 32 and terminating in a male buckle 33. The webbing strap 30 at this end is free for movement through the loop 32. A pair of threaded studs 34 are fixed to metal backing plates 35 which are located within the cover 28 on the inside of the panel 26 and symmetrically of the center of the harness 25, the studs 34 extending outwardly through openings in the panel 26 and cover 29 on the rear side of the harness 25. The studs 34 however as shown in FIG. 11 are inserted into the respective apertures 22 in the lugs 21 and secured by means of nuts to the lugs 21. This fixes the harness 25 securely to the attaching frame 16. The studs 34 can rotate within the apertures 21 thereby allowing the harness 25 to pivot to a limited extent about an axis B-B extending transversely of the frame 16 and axis A-A. (see FIG. 4). In an alternatively arrangement, the lugs 21 may be eliminated and the studs 34 simply secured directly to the arms 17 to provide the desired pivotal movement for the harness 25.

Figure 5:
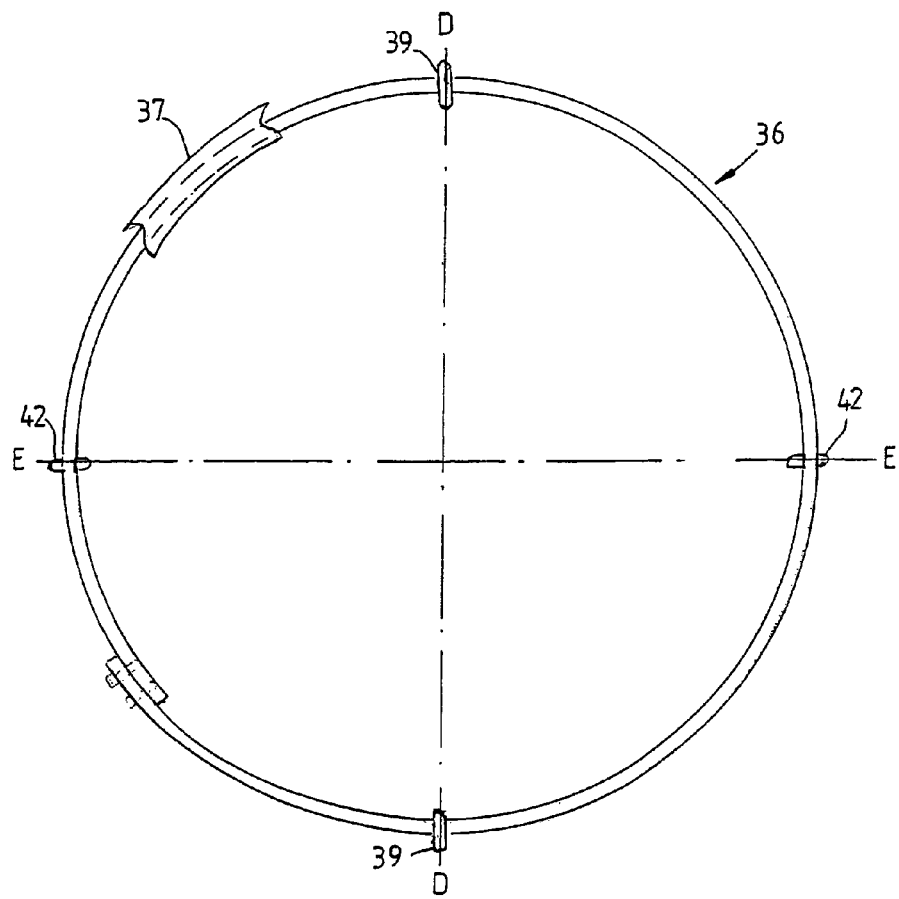
FIG. 5 is a plan view of the intermediate support frame.
Figure 6:
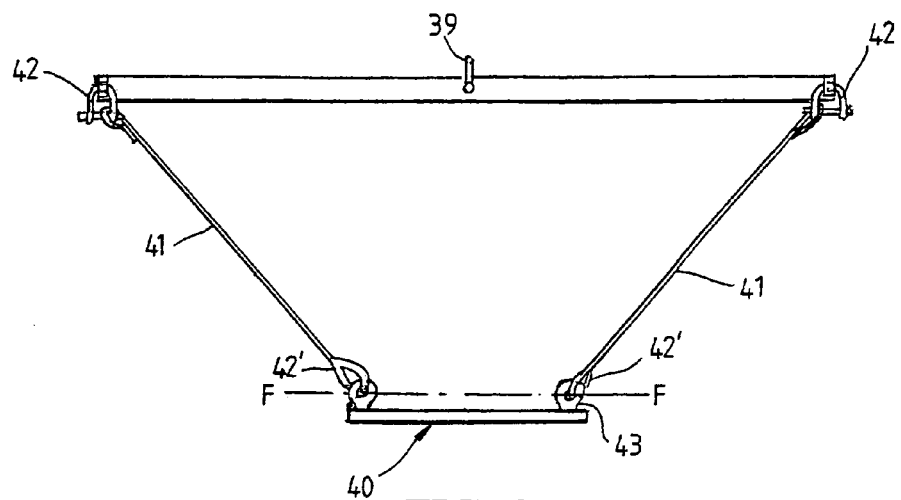
FIG. 6 is a side view of the intermediate support frame and suspended board of the simulator.
Figure 7:
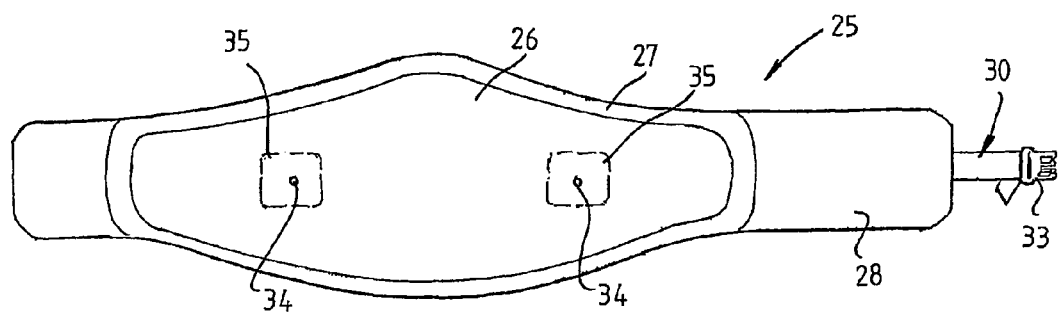
FIGS. 7 and 8 illustrate in opposite elevational views the harness of the simulator.
Figure 8:
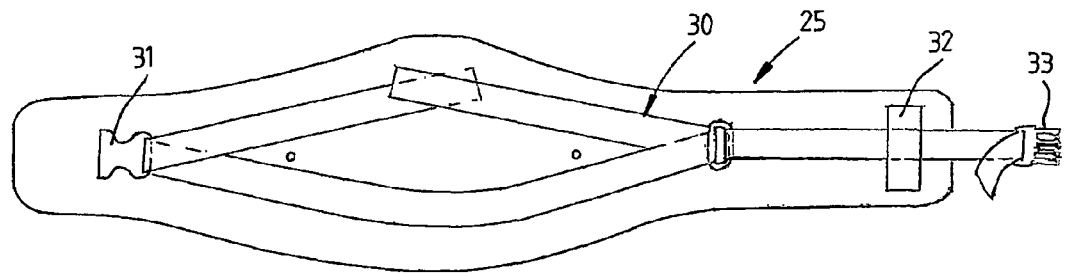
Figure 9:
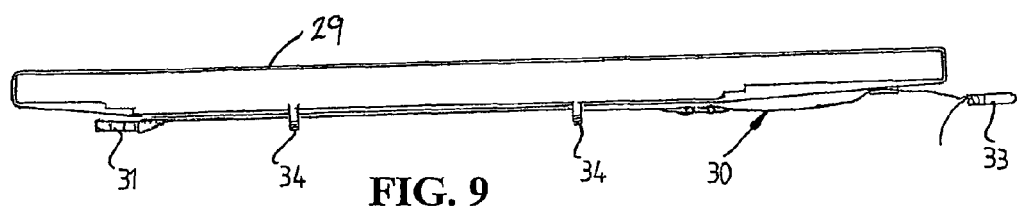
FIG. 9 is a top view of the harness.
Figure 10:
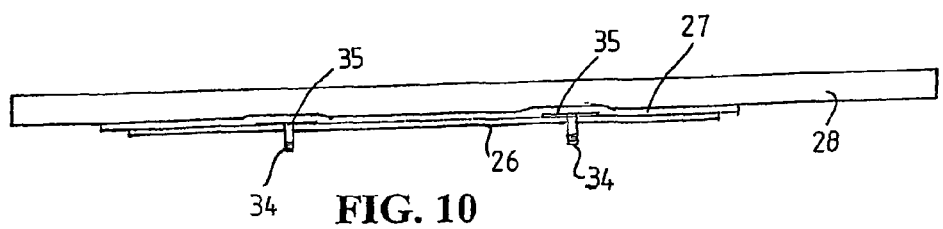
FIG. 10 illustrates further details of the harness construction.

An intermediate board-supporting pivot frame 36 shown also in FIGS. 5 and 6 is suspended from the sub-frame 16, the frame 36 typically comprising an annular rigid metal or glass reinforced plastics ring. The ring-like frame 36 is covered with a light protective padding 37 such as neoprene tubing. Opposite elements or lines 38 which can comprise flexible elements or lines such a chain, pre-stretched rope, webbing, wire or cable or combinations thereof secure the ring-like frame 36 to the sub-frame 16, the elements or lines 38 being secured at their lower ends by shackles 39 to opposite diametrical parts of the frame 36. The upper ends of the elements or lines 38 are secured to the respective lugs 23 through selected apertures 24 therein using suitable shackles or other connecting arrangement. As an alternative to flexible elements or lines 38, elongated rigid links may be used, being pivotally connected to the frame 36 and the frame 16 respectively in a similar manner. The connection between the elements 38 and lugs 23 defines a first pivot axis C-C extending transversely of the longitudinal axis A-A and the connection between the elements 38 and intermediate frame 36 defines a second pivot axis D-D extending substantially parallel to the first pivot axis C-C (see FIG. 1).

An elongated generally planar board 40 (shown also in FIGS. 12 and 13) which is similar in size and shape to a skateboard, snowboard or kite surfing deck and can be made of materials such as fiberglass, metal or plywood for strength is suspended from the intermediate frame 36 by two further lines or elements 41. The lines or elements 41 are secured at their upper ends to the frame 36 by shackles 42 at opposite diametrical portions of the frame 36 at positions spaced 90 degrees from the attachment points of the lines 38 to the frame 36 via the shackles 39. The connection between the upper ends of the lines or elements 41 and intermediate frame 36 defines a third pivot axis E-E at right angles to the first and second pivot axes C-C and D-D.

Figure 12:
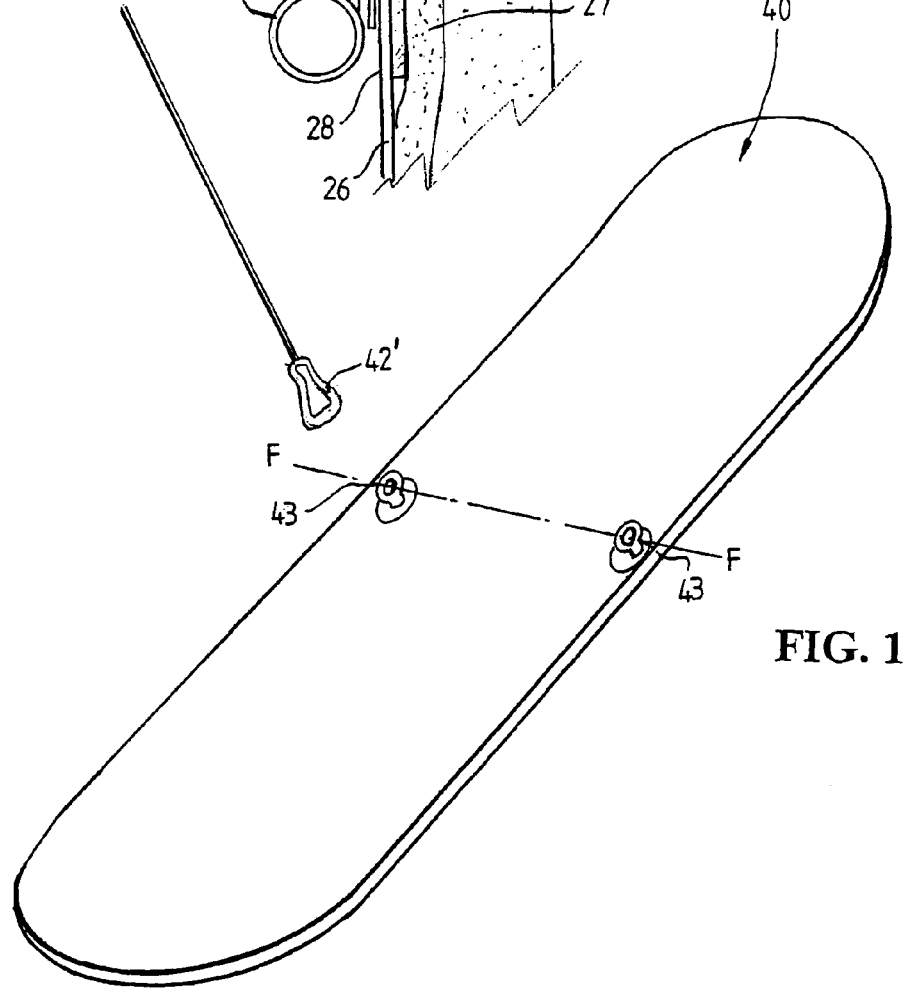
FIGS. 12 and 13 illustrate in isometric and side views, one form of board used in the simulator.
Figure 13:
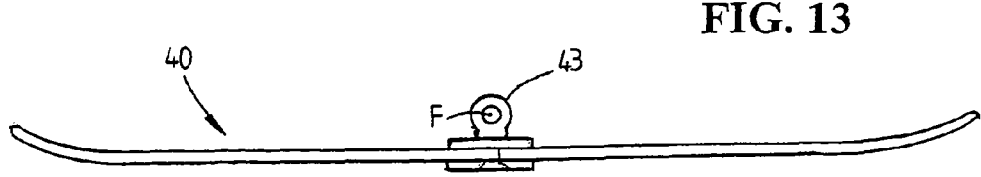

The elements or lines 41 which may be chains, pre-stretched ropes, webbing, wires or cables or combinations thereof are secured to opposite sides of the board 39 intermediate the opposite ends of the board 39 at the balance point of the board 39 so that the board 39 is capable of pivoting about an axis F-F indicated in dotted outline in FIGS. 6 and 12 extending normal to the longitudinal axis of the board 39. The elements or lines 41 are attached to the board 40 by any suitably couplings such as snap shackles 42' which are releasably secured to eyebolts 43 fixed to opposite transverse sides of the board 40. The eyebolts 43 are positioned intermediate opposite ends of the board 40 leaving the opposite ends of the board 40 free and define the transverse pivot axis F-F extending parallel to the axis E-E. The pivot axis F-F defined by the eyebolts 43 is substantially centrally of the opposite ends of the board 40 so that the board 40 is substantially balanced relative to the axis F-F. In an alternative arrangements the elements or lines 41 may comprise elongated rigid links pivotally attached at opposite ends to the frame 36 and board 40.

Figure 14:
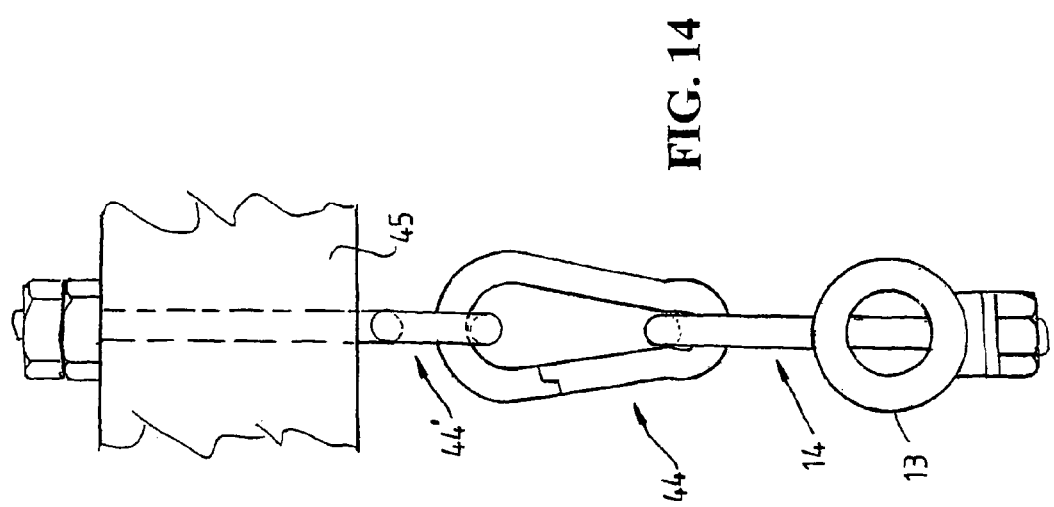

For installation and as shown in FIG. 14, the simulator 10 is suspended from any solid anchor point using for example the eyebolt 14 which is connected to the end 13 of the main frame member 12 so that the frame member 12 can pivot in any direction about the axis of the bolt 14. A snap shackle 44 is used to connect the eyebolt 14 to a further eyebolt 44' bolted thorough a beam 45. The simulator 10 is suspended from the beam 45 such that there is sufficient clearance between the floor or ground and the board 40 so that the end of the board 40 just touches or is just above the floor or ground when fully tilted back or forward about its pivot axis defined by the eyebolt 14. It will be appreciated that the mounting shown in FIG. 14 allows pivoting or swiveling of the simulator 10 about a vertical axis defined by the axis of the eyebolt 14 as well as swinging in any direction about horizontal axes.

Figure 15:
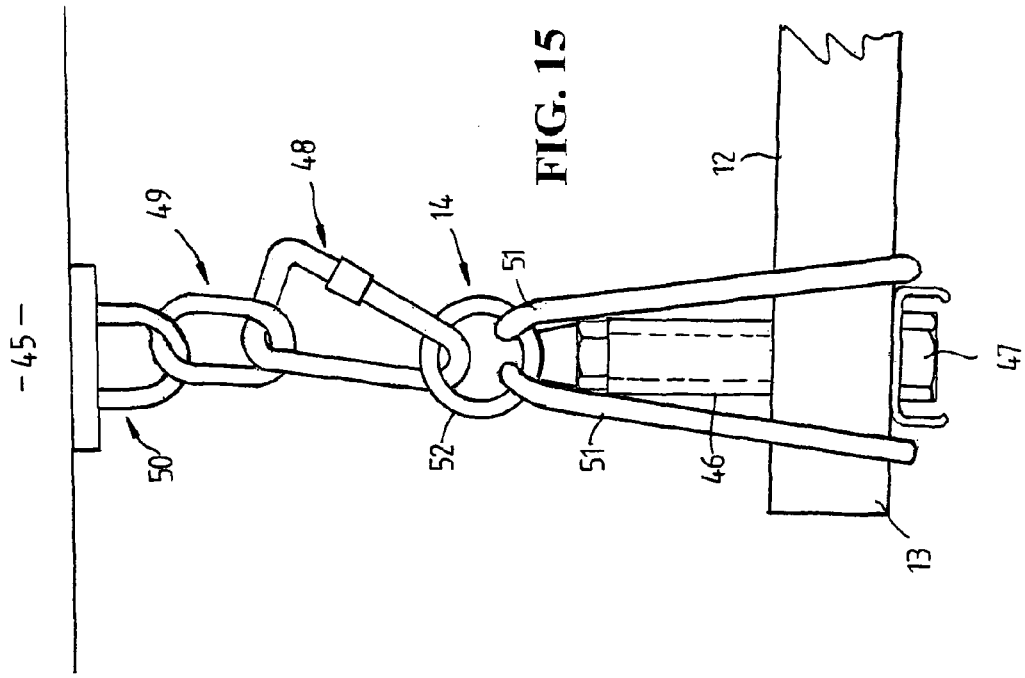
FIGS. 14 and 15 illustrate alternative mounting arrangements for supporting the simulator.

In the suspending arrangement shown in FIG. 15 which is designed to limit rotational movement of the simulator 10, the eyebolt 14 extends at right angles to the end 13 of the main frame member 12 and passes through a spacer 46 and is fixed in position by nut 47 so as to be capable of rotation about its longitudinal axis. The eyebolt 14 is connected through a shackle 48, and chain link 49 to an eyeplate 50 which is secured such as by bolting to the beam 45. A pair of resilient resistance rings 51 of rubber or other resilient or elastic material extend between the end 13 of the main frame member 12 and eye 52 of the eyebolt 14 on opposite sides of the eyebolt 14. Alternatively the pair or rings 51 may be replaced by a single ring. This form of suspension arrangement for the simulator 10 provides for self-centering of the simulator. Thus if the main frame assembly 11 and thus suspension frame member 12 of the simulator 10 is rotated in either direction, the resilient ring or rings 51 will be tensioned and tend to oppose rotational movement of the simulator 10 and return the simulator 10 to a neutral position.

Figure 16:
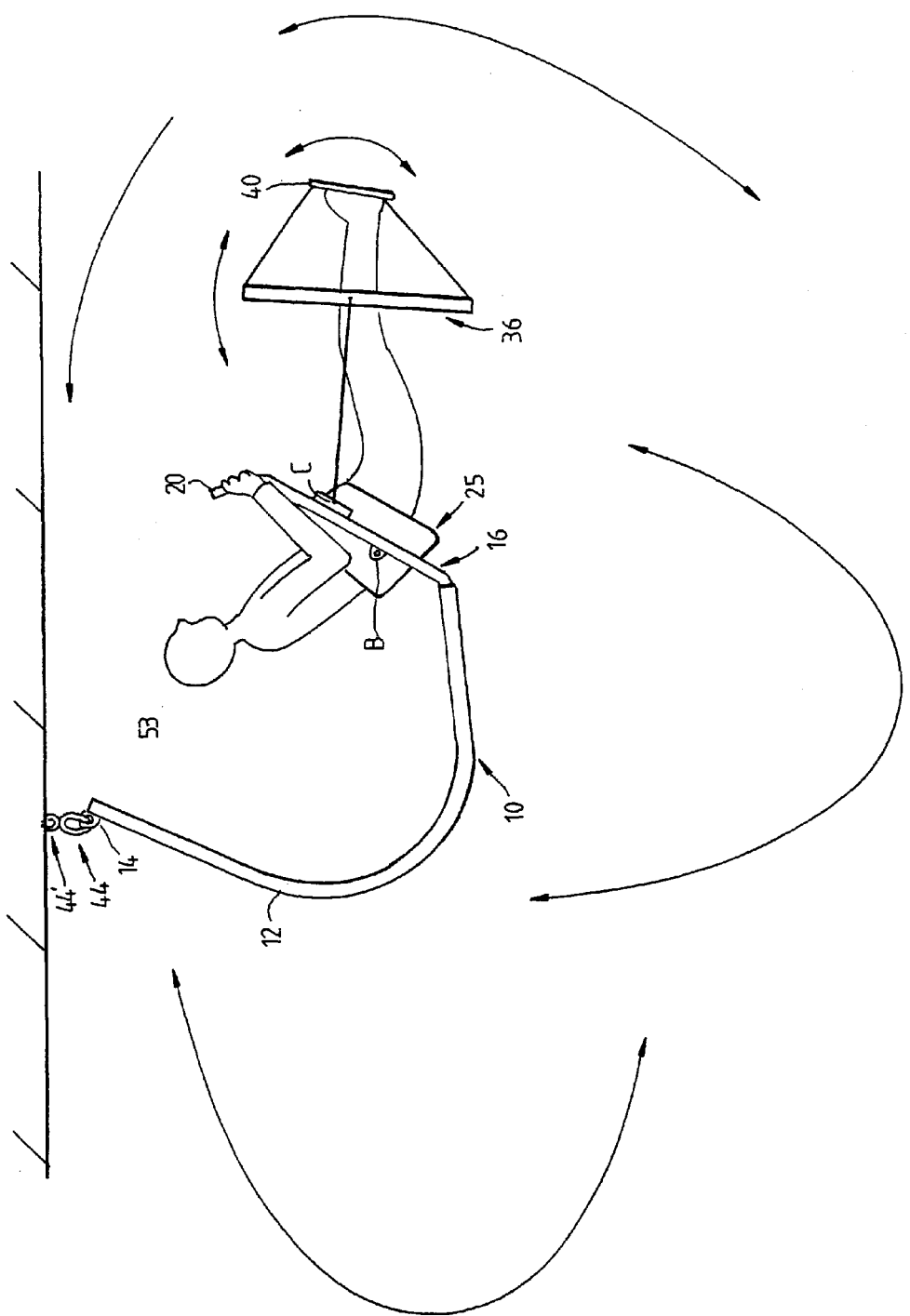
FIG. 16 illustrates the manner in which the simulator is used.

In use and as shown in FIGS. 1 and 16, a rider 53 steps onto the board 40 which is steadied by tipping one end onto the ground. The rider 53 then backs into the harness 25 and fastens the clips 31 and 33 around his or her waist or hips and tightens the straps 30 so as to be attached to the frame 16. The rider 53 now has the suspension frame member 12 at their back with the arms 17 extending forwardly on opposite sides of the body at the level of their waist or hips.

The rider 50 grasps the hand grips 20 on the handles 19, levels the board 40 with his or her feet and by shifting his or her weight starts the simulator 10 swinging. The pivot axis C-C is positioned substantially at the level of the hip joints so that the rider 50 by bending at the hips will cause the board 40 and intermediate frame 36 to pivot about the axis C-C. This movement can also be accompanied by pivotal movement of the harness or belt 25 about the axis B-B. The axis D-D is positioned substantially at the level of the knees so that flexing or bending of the knees will cause pivotal movement of the intermediate frame 36 and board 40 about the axis D-D. The board 50 can also be pivoted by the rider about both the axes E-E and F-F.

Figure 17:
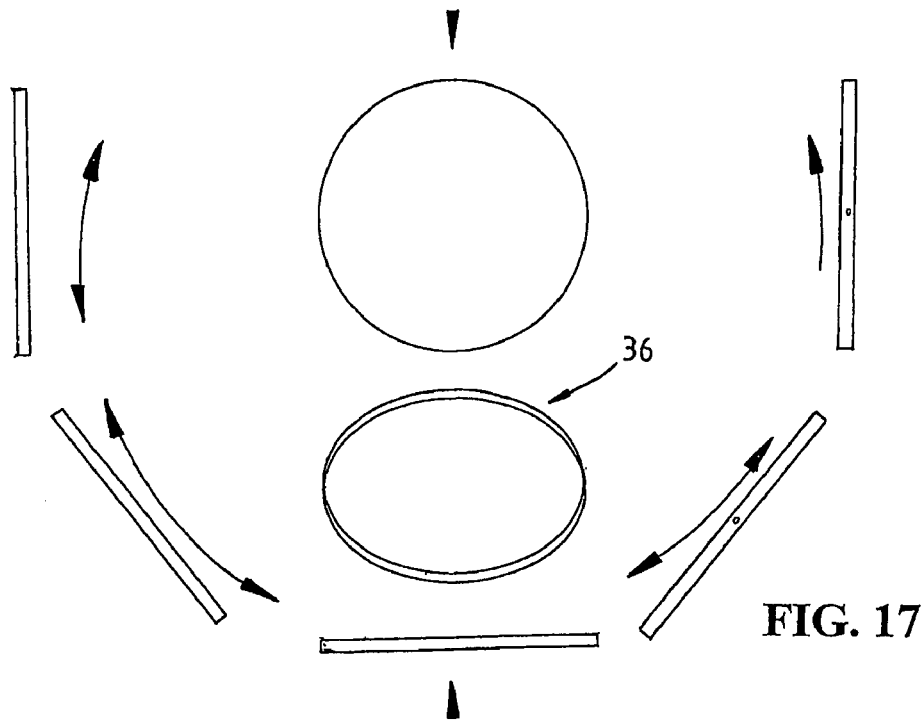
FIG. 17 illustrates from the front or side typical movements of the intermediate frame of the simulator.
Figure 18:
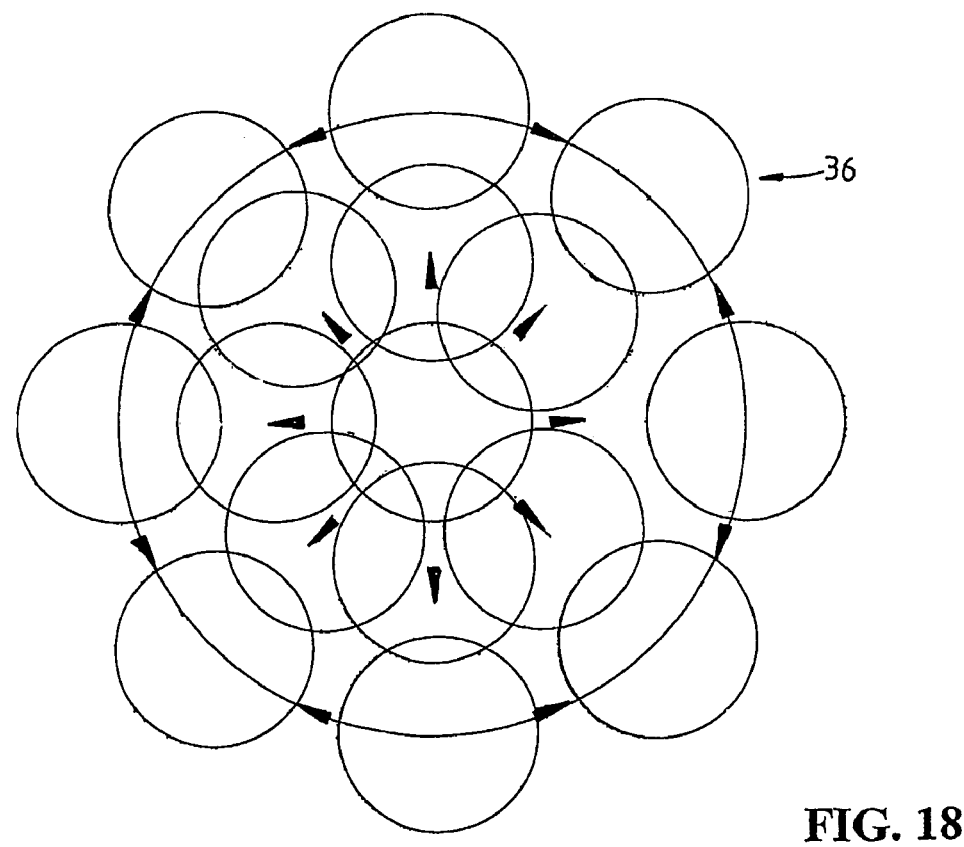
FIG. 18 is a plan view illustrating typical movements of the intermediate frame.
Figure 19:
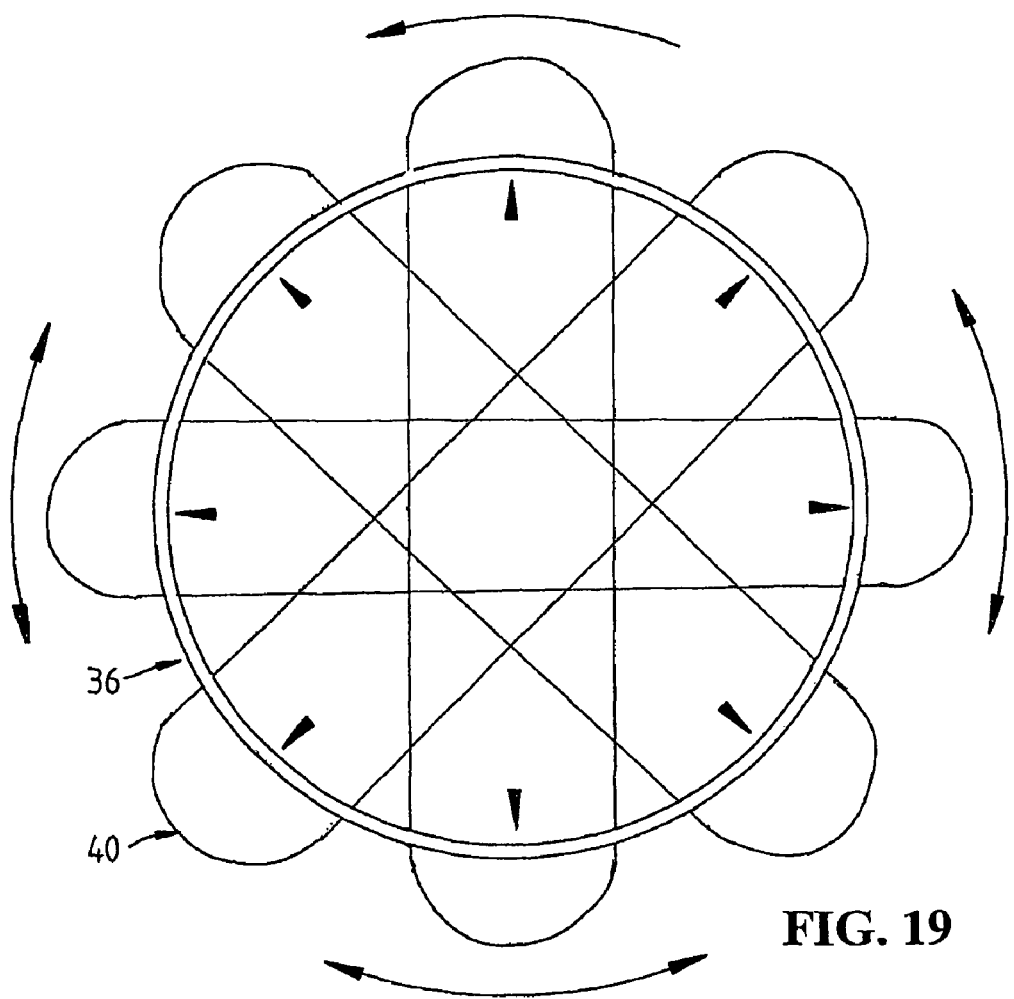
FIG. 19 is a plan view illustrating typical movements of the board and intermediate frame.
Figure 20:
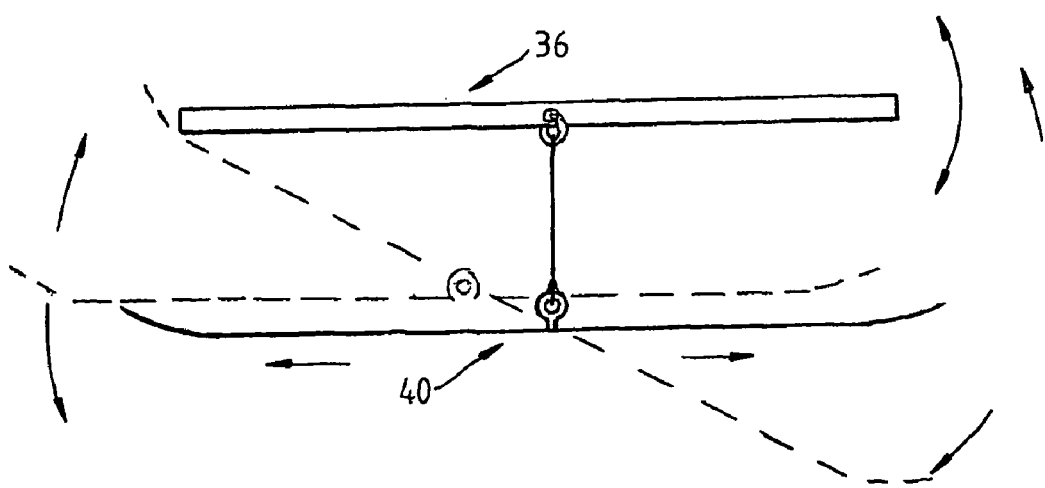
FIG. 20 is a side view illustrating typical movements of the board of the simulator.

The board 40 can also be turned and rotated due to the suspension of the main frame assembly 11 from its anchor point so that the rider can reproduce the manoeuvres about a number of different axes as seen in surfing, snowboarding, skateboarding or kite surfing as indicated by the arrows in FIG. 16. The ring-like intermediate frame 36 as shown in FIG. 17 can swing from a horizontal attitude to a 90° substantially vertical position or beyond in any direction and move about a vertical axis defined by the swivel mounting of the simulator 10. A rider can easily swing up to a more than 45° position in any direction relative to the ring 36 and up to a 90° position with the ring 36 whilst the frame 36 and board 40 can be rotated 360° as is apparent in FIG. 19. The harness 25 prevents the rider from falling and also provides additional control of the simulator 10 by body movements. As the rider gains experience the handle members 19 can be removed leaving the arms free and allowing full unencumbered movement of the rider's arms. Alternatively the rider can use the apparatus 10 without the harness 25 and simply grip the handle member 19.

Of course the simulator 10 may be secured in any manner to an elevated mounting such as to a main ceiling beam, a cross rail of any form, a dedicated frame such as to a frame similar to a frame for a swing or a strong tree limb. Other means other than eyebolts may be used to secure the simulator 10 in position.

The gimbals-like suspension allows freedom of movement of the board so a rider on the simulator can reproduce the turning manoeuvres, G-forces and weightlessness, speed and technical application of the real sports. The simulator enables a rider to start at a low fitness level and increase their fitness in their chosen sport and at the same time practice and learn manoeuvres in a safe and controlled manner. Thus a rider who wishes to learn the skills required in surfboard riding or snowboarding skills does not have to go to the sea or to the snowfields to learn or enhance their skills and enjoy a ride.

The terms "comprising" or "comprises" as used throughout the specification and claims are taken to specify the presence of the stated features, integers and components referred to but not preclude the presence or addition of one or more other feature/s, integer/s, componentls or group thereof.

Whilst the above has been given by way of illustrative embodiment of the invention, all such variations and modifications thereto as would be apparent to persons skilled in the art are deemed to fall within the broad scope and ambit of the invention as defined in the appended claims.

What is claimed is:

1. A sports board simulator comprising:—a main frame assembly, said main frame assembly including a sub-frame adapted to be suspended from a single elevated anchor point via a suspension frame member whereby said main frame assembly is free for at least limited rotational pivoting and swinging movement about said anchor point, said main frame assembly being adapted to be gripped by or secured to a user of said simulator, an elongated board adapted to support said user, and board suspension members suspending said board directly or indirectly from said main frame assembly, said board suspension members being connected at a pair of spaced pivot points to said main frame assembly, said pivot points being spaced apart along a first pivot axis extending transversely of said main frame assembly, said board suspension members permitting said board to move freely relative to said main frame assembly about said pivot points.

2. A sports board simulator as claimed in claim 1 wherein said suspension frame member is adapted in use to hang from the anchor point.

3. A sports board simulator as claimed in claim 2 wherein said suspension frame member extends in use upwardly from said sub frame and over the user to the anchor point in an at-rest position and wherein said anchor point is positioned substantially above the user in use when the simulator is in the at-rest position.

4. A sports board simulator as claimed in claim 2 wherein said sub-frame is rigid with said suspension frame member and permanently fixed or detachably fixed thereto.

5. A sports board simulator as claimed in claim 4 wherein said sub-frame includes opposite arms adapted to be located on opposite side of a user and wherein respective arms are adapted to be gripped by a user.

6. A sports board simulator as claimed in claim 5 and wherein said arms or extensions thereof are provided with gripping means for gripping by the user.

7. A sports board simulator as claimed in claim 6 wherein said gripping means comprise handles.

8. A sports board simulator as claimed in 1 and including means for releasably securing a user to the sub-frame.

9. A sports board simulator as claimed in claim 8 wherein said releasable securing means comprise means adapted to be secured about the waist or hips of a user.

10. A sports board simulator as claimed 9 wherein said releasable securing means comprise a belt or harness provided with releasable attachment means to enable the belt or harness to be secured around the user's waist or hips.

11. A sports board simulator as claimed in claim 10 wherein said belt or harness is attached to the sub-frame so as to be capable of limited pivotal movement about an axis extending transversely of the sub-frame and substantially parallel to the first axis.

12. A sports board simulator as claimed in claim 1 wherein said board suspension members are connected to opposite lateral sides of the board and centrally of the board and on an axis extending transversely of the board.

13. A sports board simulator as claimed in claim 12 wherein said board suspension members comprises an intermediate frame suspended from the pivot points on the main frame assembly so as to be capable of pivoting movement about the first pivot axis.

14. A sports board simulator as claimed in claim 13 wherein said board suspension members comprises first suspending members suspending the intermediate frame from the sub-frame for pivotal movement of the intermediate frame about the first pivot axis.

15. A sports board simulator as claimed in claim 14 wherein said intermediate frame is supported by said first suspending members for pivotal movement about a second pivot axis which is spaced from and substantially parallel to the first pivot axis.

16. A sports board simulator as claimed in claim 15 wherein said first suspending members comprise a pair of first suspending elements at opposite sides of the intermediate frame.

17. A sports board simulator as claimed in claim 16 wherein said intermediate frame comprise an annular or ring-shaped member.

18. A sports board simulator as claimed in claim 16 wherein said first suspending elements are connected at their upper ends to the sub-frame and at their lower ends to the intermediate frame and wherein the connection of said first elements to said sub-frame defines said first pivot axis and wherein the connection of said first elements to said intermediate frame defines said second pivot axis.

19. A sports board simulator as claimed in claim 18 wherein said first elements comprise one of ropes, webbing, cords, chains, wire, rigid links or a combination thereof.

20. A sports board simulator as claimed in 15 wherein said board is suspended by second suspending members from the intermediate frame for movement about a third pivot axis extending substantially normal to the first and second pivot axes in the at rest position.

21. A sports board simulator as claimed in claim 20 wherein said second suspending members comprise opposite second suspension elements connected at their upper ends to the intermediate frame and at their lower ends to the board, the connection of the suspension elements to the intermediate frame defining the third pivot axis.

22. A sports board simulator as claimed in claim 21 wherein said second suspending elements are connected to the intermediate frame on diametrically opposite sides thereof at a position substantially at 90 degrees to the connection of the first suspending elements to the intermediate frame.

23. A sports board simulator as claimed in claim 21 wherein said lower ends of the second suspending elements are connected to said opposite lateral sides of said board and define a fourth pivot axis for the board extending substantially parallel to the third pivot axis in the at rest position.

24. A sports board simulator as claimed in claim 23 wherein said second suspending elements comprise ropes, webbing, cords, chains, wires or rigid links or combinations thereof.

25. A sports board simulator as claimed in claim 1 and including means for resisting pivotal movement of the main frame assembly about a vertical axis.

26. A sports board simulator as claimed in claim 25 wherein said resisting means comprise resilient or elastic means which provide a resilient resisting force to rotation of the main frame assembly and adapted to return the main frame assembly towards a self centering position.

27. A sports board simulator comprising:—a main frame assembly adapted to be suspended from a single elevated anchor point whereby said frame assembly is free for at least limited rotational pivoting and swinging movement about said anchor point, said main frame assembly being adapted to be gripped by or secured to a user of said simulator, an elongated board adapted to support said user, and first and second suspension members suspending said board directly or indirectly from said main frame assembly, said suspension members being connected respectively at a pair of spaced pivot points to said main frame assembly, said pivot points being spaced apart along an axis extending transversely of said main frame assembly, said axis being positioned in use substantially at the level of the hips of the user, and said suspension members permitting said board to move freely relative to said main frame assembly about said pivot points.

28. A sports board simulator as claimed in claim 27 including means for releasably securing a user to the main frame assembly and wherein said first and second suspension members are connected to opposite lateral sides of the board and centrally of the board and on an axis extending transversely of the board.

29. A sports board simulator as claimed in claim 27 wherein said first and second suspension members suspend an intermediate frame from the main frame assembly for pivotal movement of the intermediate frame about the first pivot axis, said intermediate frame being supported by said first suspending members for pivotal movement about a second pivot axis which is spaced from and substantially parallel to the first pivot axis wherein said board is suspended by further suspending members from the intermediate frame for movement about a third pivot axis extending substantially normal to the first and second pivot axes in the at rest position of said board.

* * * * *